United States Patent
Simon et al.

(10) Patent No.: US 8,677,863 B2
(45) Date of Patent: Mar. 25, 2014

(54) FASTENER POSITIONING DEVICE

(75) Inventors: Timothy Simon, Wooster, OH (US);
Raymond Imars, Ashland, OH (US);
Kenneth Gloeckner, Medina, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 449 days.

(21) Appl. No.: 12/972,043

(22) Filed: Dec. 17, 2010

(65) Prior Publication Data

US 2011/0146455 A1  Jun. 23, 2011

Related U.S. Application Data

(60) Provisional application No. 61/288,532, filed on Dec. 21, 2009.

(51) Int. Cl.
*B25B 17/00* (2006.01)

(52) U.S. Cl.
USPC ............... 81/57.37; 29/253; 227/149; 227/70

(58) Field of Classification Search
USPC ........ 81/54, 57.37–431, 44; 29/255, 270, 278
See application file for complete search history.

(56) References Cited

U.S. PATENT DOCUMENTS

| 3,452,418 A | | 7/1969 | Ernest et al. | |
|---|---|---|---|---|
| 3,668,760 A | * | 6/1972 | Biederman et al. | 227/149 |
| 4,239,143 A | * | 12/1980 | Johnson | 227/70 |
| 4,557,029 A | * | 12/1985 | Stewart | 29/253 |
| 4,775,090 A | * | 10/1988 | Kuo | 227/149 |
| 6,021,562 A | | 2/2000 | Boster et al. | |

* cited by examiner

*Primary Examiner* — Lee D Wilson
*Assistant Examiner* — Melanie Alexander
(74) *Attorney, Agent, or Firm* — Simpson & Simpson, PLLC

(57) ABSTRACT

A fastener positioning device for a die block including a punch tube arranged to receive the fastener, at least one aperture extending radially out from the tube, at least one displaceable retainer disposed in the at least one aperture, and a resilient ring urging the at least one retainer towards an axis of the punch tube. In an example embodiment of the invention, the aperture includes a first diameter proximate the punch tube and a second, larger diameter radially outside of the first diameter. The retainer may be a ball, the resilient ring may be an O-ring, and the fastener may be a stud or nut.

13 Claims, 5 Drawing Sheets

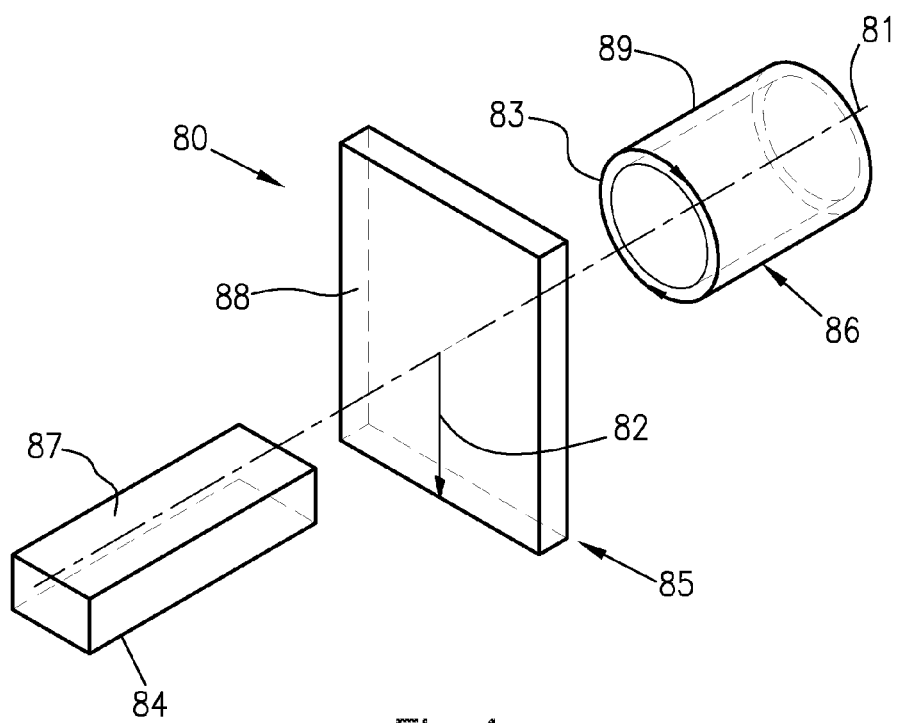
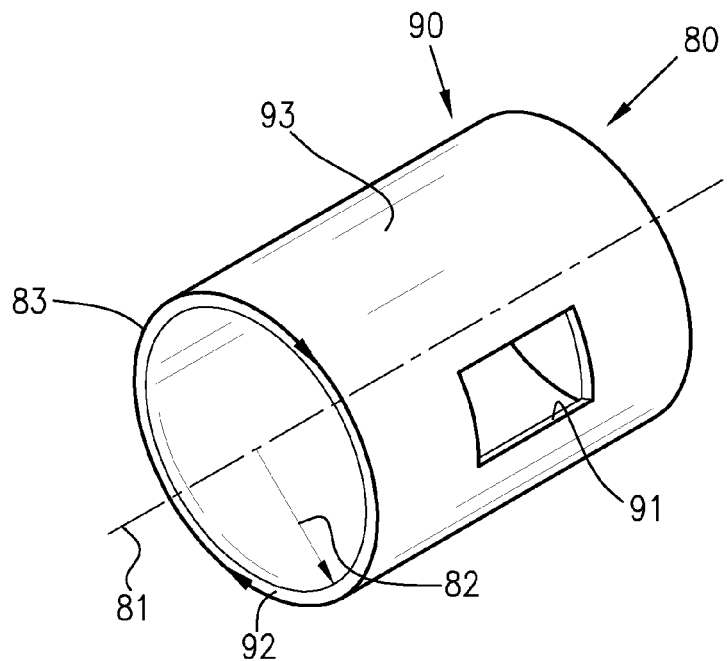

FASTENER POSITIONING DEVICE

CROSS-REFERENCE TO RELATED APPLICATIONS

This application claims the benefit under 35 U.S.C. §119(e) of U.S. Provisional Application No. 61/288,532, filed Dec. 21, 2009.

FIELD OF THE INVENTION

The invention relates generally to a fastener positioning device, and more specifically to a fastener positioning device for a die block in a stamping press.

BACKGROUND OF THE INVENTION

U.S. Pat. No. 6,021,562, assigned to Haeger, Inc., describes a fastener insertion module for a progressive die that uses a special bisected bushing. The bushing securely holds and positions each fastener in place prior to and during insertion. U.S. Pat. No. 3,452,418, assigned to Penn Engineering, describes a gate for an automatic fastener press. The gate includes a pilot spring extending to a hole of a fastening element such as a nut, for example.

BRIEF SUMMARY OF THE INVENTION

Example aspects of the present invention broadly comprise a fastener positioning device for a die block including a punch tube arranged to receive the fastener, at least one aperture extending radially out from the tube, at least one displaceable retainer disposed in the at least one aperture, and a resilient ring urging the at least one retainer towards an axis of the punch tube. In an example embodiment of the invention, the aperture includes a first diameter proximate the punch tube and a second, larger diameter radially outside of the first diameter. The retainer may be a ball, the resilient ring may be an O-ring, and the fastener may be a stud or nut.

In some example embodiments of the invention, the fastener positioning device has a chute portion connected to the punch tube, and the chute portion is arranged to guide the fastener into the punch tube. The fastener may be gravity-fed through the chute portion into the punch tube. The device may also include a punch arranged to travel through the punch tube to install the fastener. In an example embodiment of the invention, the at least one retainer is arranged to be radially displaced by the fastener.

In some example embodiments of the invention, in response to an axial force upon the fastener in an axial direction, the fastener is axially displaceable in the axial direction to radially outwardly displace the at least one retainer. The at least one retainer may be radially outwardly displaceable such that the fastener is displaceable past the at least one retainer in the axial direction.

Other example aspects of the present invention broadly comprise a method of installing a fastener in a plate by radially contracting a plurality of retainers with a resilient ring, introducing the fastener through a chute portion, and axially positioning a radial surface of the fastener on the plurality of retainers. The method may include axially displacing the fastener with a punch, radially displacing the retainers with the fastener, and inserting the fastener into a hole in the plate.

Other example aspects of the present invention broadly comprise a fastener positioning device for a die block including a punch tube arranged to receive a stud or nut, and a plurality of apertures extending radially out from the tube. The tube has an axis and each aperture has a first diameter, a second diameter less than the first diameter, and a respective lip proximate the tube. The fastener positioning device includes a plurality of balls disposed in the plurality of apertures and an O-ring urging the plurality of balls towards the axis. The plurality of balls is radially displaceable by axial displacement of the stud or nut.

BRIEF DESCRIPTION OF THE DRAWINGS

The nature and mode of operation of the present invention will now be more fully described in the following detailed description of the invention taken with the accompanying drawing figures, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application;

DETAILED DESCRIPTION OF THE INVENTION

Figure 2:
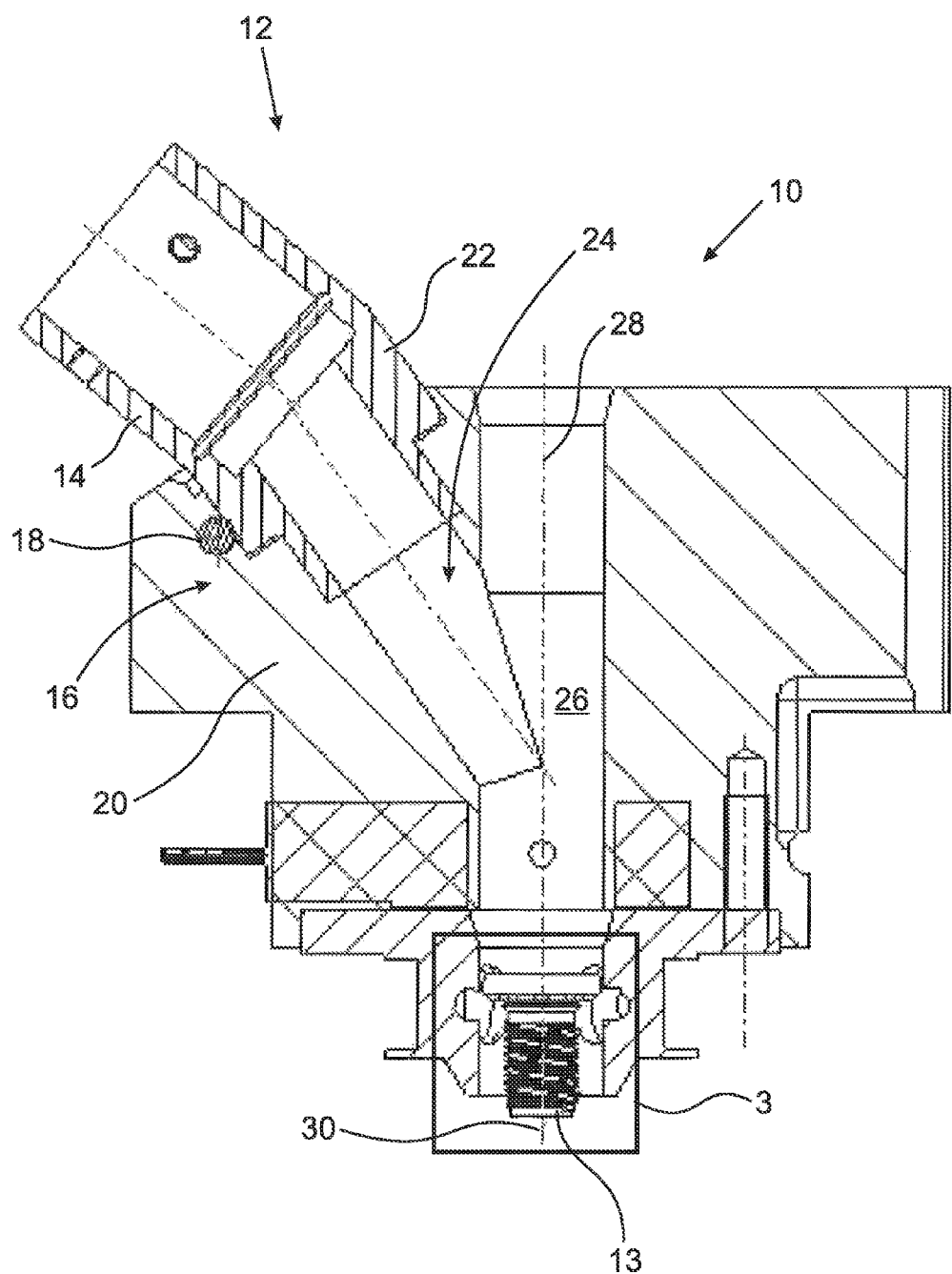
FIG. 2 is a cross-section view of a fastener positioning device for a die block, according to an example aspect of the invention.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" refer to an orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

The following description is made with reference to FIG. 2. FIG. 2 is a cross-section view of a fastener positioning device for a die block, according to an example aspect of the invention. Fastener positioning device 10 may be assembled in a die block (not shown) for a stamping press (not shown). Fastener positioning device 10 includes chute portion 12 attached to a fastener tube (not shown). The fastener tube works with a synchronizing mechanism that transmits individual fasteners through the tube as the press operates. In some example embodiments of the invention, the fastener tube transmits studs 13 or nuts (not shown). The synchronizing mechanism controls timing such that a single stud 13 is correctly oriented and introduced to the positioning device 10 between strokes of the stamping press.

Stud 13 is positioned as described supra before being installed into a plate (not shown) by a die punch (not shown). Chute portion 12 includes stud tube connection portion 14, retaining portion 16 held by pin 18 in block 20, and angled section 22. Angled section 22 is aligned with angled hole 24 in block 20. Angled hole 24 connects angled section 22 to punch tube 26, thereby guiding stud 13 into punch tube 26. Punch tube 26 includes axis 28. In an example embodiment of the invention, the fastener is gravity-fed through chute portion 12 into punch tube 26.

Figure 3:
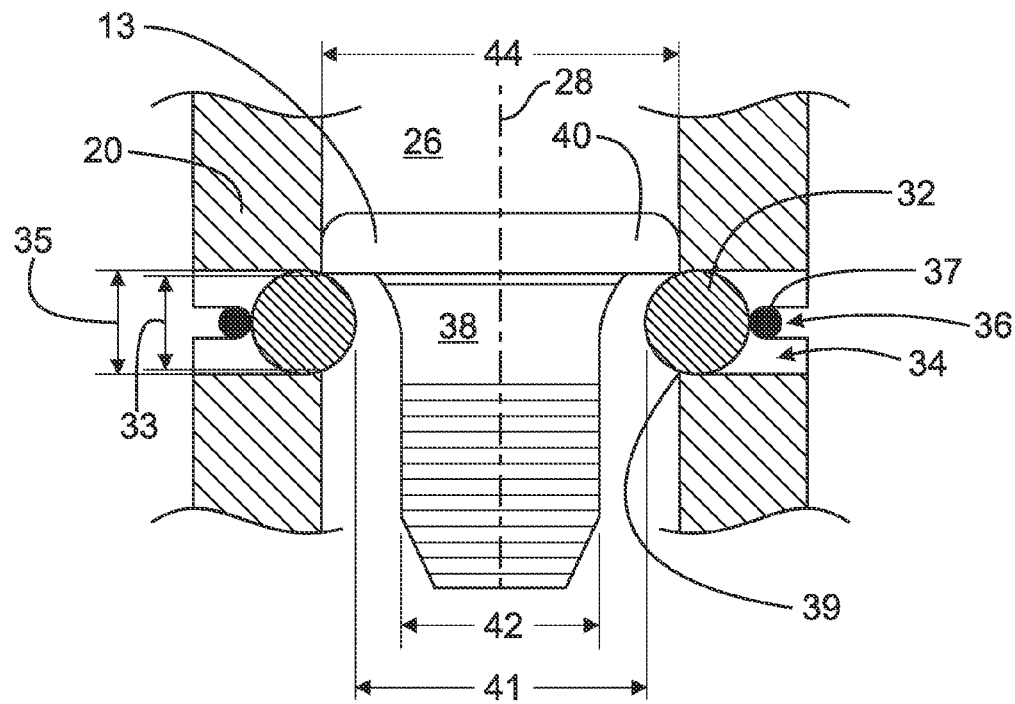
FIG. 3 is a detail view of encircled region 3 in FIG. 2.
Figure 3A:
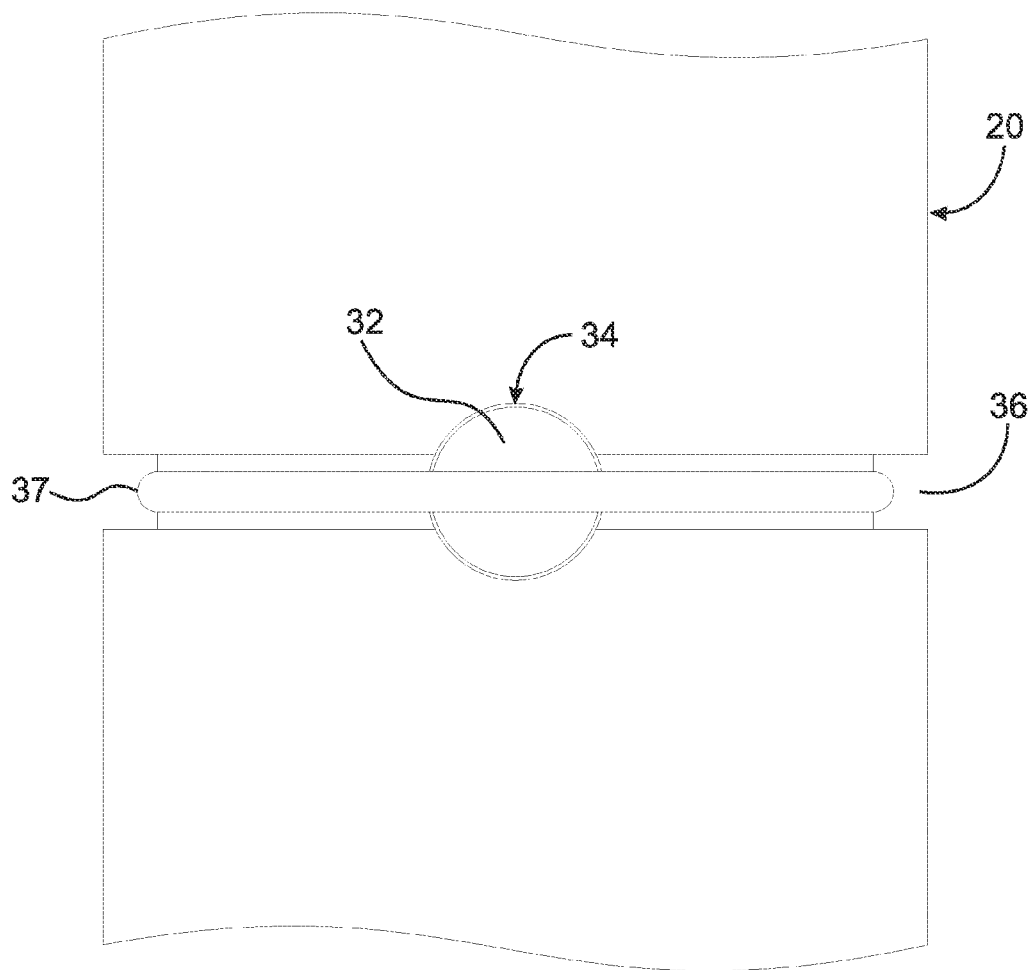
FIG. 3A is a side view of encircled region 3, FIG. 3.

The following description is made with reference to FIG. 3. FIG. 3 is a detail view of encircled region 3 in FIG. 2. Stud 13 is axially positioned in punch tube 26 by retainers 32 disposed in apertures 34. In the embodiment shown, retainers 32 are balls, but other configurations of retainers 32 are possible. For example, retainers 32 may include a block with a tapered end. Apertures 34 extend radially out from tube 26. FIG. 3A is a side view of encircled region 3, FIG. 3.

Retainers 32 are located radially inward of groove 36. In an example embodiment of the invention, diameter 35 of recesses 34 is not constant through block 20 and prevents balls 32 from falling into punch tube 26. Aperture 34 comprises diameter 33 proximate punch tube 26 and diameter 35 radially outside of diameter 33. Diameter 35 is larger than diameter 33. In an example embodiment of the invention, aperture 34 tapers radially inward. In one embodiment, diameter 35 is constant up to edge 39 which has diameter 33.

Resilient ring 37 is positioned in groove 36. Ring 37 may be an O-ring made of rubber or another elastic material, or a circularly-formed coil spring, for example. Ring 37 radially contracts balls 32 against edge 39 of recess 34 proximate stud shaft 38. That is, ring 37 urges retainer 32 towards axis 28. Edge 39 may be a rim or ledge for restricting motion of balls 32 towards axis 28. Balls 32 are radially positioned on diameter 41 slightly larger than diameter 42 of stud shaft 38 so that stud 13 easily slides into position between balls 32. Stud head 40 axially positions stud 13 in relation to balls 32 in punch tube 26. That is, diameter 44 of stud head 40 is larger than diameter 41, and contact between balls 32 and stud head 40 controls axial position of stud 13 in punch tube 26. That is, a radial surface of stud head 40 rests on retainers 32.

Figure 4:
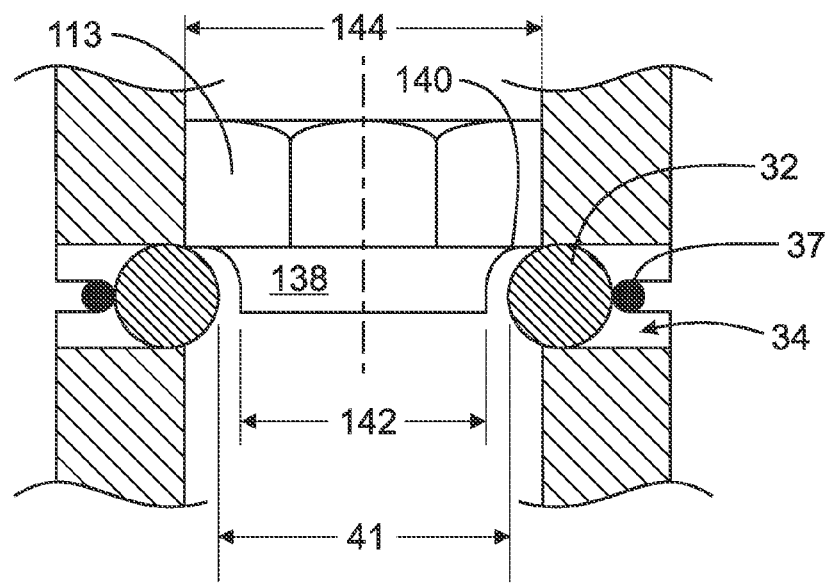
FIG. 4 is a detail view of encircled region 3 in FIG. 2 showing an alternative embodiment of the invention; and, FIG. 5 is a partial cross section view of a die block with a fastener positioning device, according to an example aspect of the invention.

The following description is made with reference to FIG. 4. FIG. 4 is a detail view of encircled region 3 in FIG. 2 showing an alternative embodiment of the invention. Nut 113 is axially positioned in punch tube 26 by retainers 32 disposed in apertures 34. The configuration of retainers 32, apertures 34 and ring 37 described supra applies to this embodiment as well.

Balls 32 are radially positioned on diameter 41 slightly larger than diameter 142 of nut installation ring 138 so that nut 113 easily slides into position between balls 32. Nut base 140 axially positions nut 113 in relation to balls 32 in punch tube 26. That is, diameter 144 of nut base 140 is larger than diameter 41, and contact between balls 32 and nut base 140 controls axial position of nut 113 in punch tube 26. That is, nut base 140 rests on retainers 32.

Figure 5:
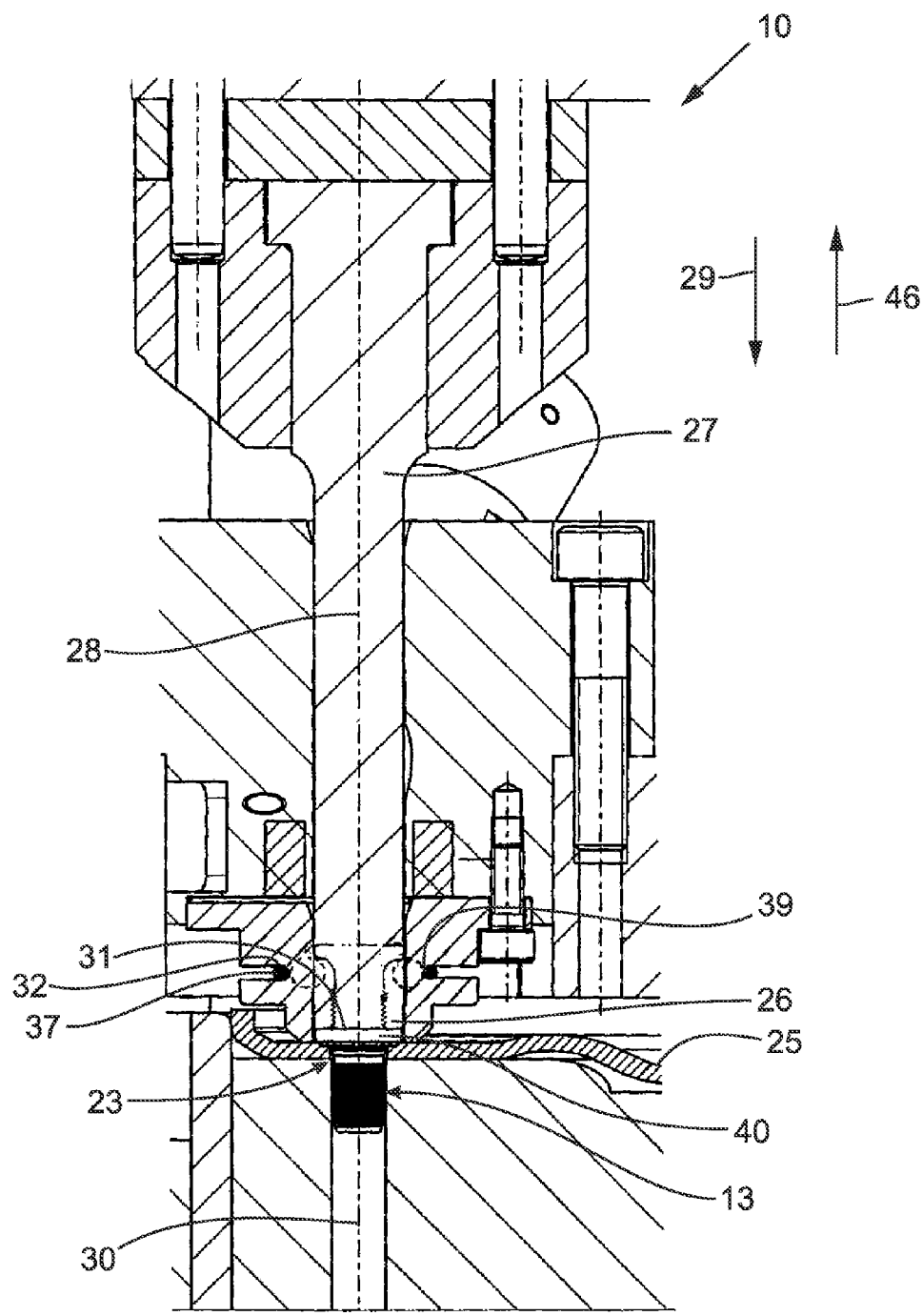

The following description is made with reference to FIG. 5. FIG. 5 is a partial cross section view of a die block with a fastener positioning device, according to an example aspect of the invention. Fastener positioning device 10 may include stud insertion punch 27. Punch tube 26 is disposed perpendicular to plate 25 so that stud insertion punch 27 moves along punch tube axis 28, parallel to stud axis 30, when displaced in direction 29 by the stroke of the stamping press (not shown). Stud 13 is inserted into plate 25 by punch 27 traveling along punch tube axis 30. When head 31 of punch 27 contacts head 40 of stud 13, head 40 is pushed in direction 29 displacing retainers 32. That is, axial force on head 40 radially displaces the retainers and resilient ring 37 so that stud 13 travels through tube 26 towards plate 25. The tube aligns the stud with hole 23 in plate 25 so that additional force acting on punch 27 installs stud 13 into plate hole 23.

After installation of stud 13 into plate hole 23, punch 27 is retracted in direction 46, opposite direction 29. Once punch 27 is retracted past retainers 32, ring 37 urges retainers into contact with edge 39 as described supra. Once punch 27 is retracted past angled hole 24, another stud 13 is introduced through chute portion 12 into positioning device 10. Punch 27 is then moved in direction 29 to install new stud 13 into new plate 25.

Although fastener positioning device 10 is shown with a particular number of retainers 32, device 10 may include other numbers of balls or retainers. Generally, at least three retainers are preferred to properly position stud 13 in the tube.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A fastener positioning device for a die block, comprising:
   a punch tube arranged to receive a fastener, the tube comprising an axis;
   first and second apertures extending radially out from the tube;
   a groove circumferentially disposed about the punch tube and connecting with the first and second apertures;

first and second displaceable retainers disposed in the at least one first and second apertures, respectively; and, a resilient ring in contact with the first and second retainers and urging the at least one first and second retainers towards the axis, wherein the resilient ring is positioned within the groove.

2. The fastener positioning device of claim 1, wherein the first and second apertures comprise first respective diameters proximate the punch tube and second respective, larger diameters radially outside of the first diameter.

3. The fastener positioning device of claim 2, wherein the first and second retainers comprise respective balls.

4. The fastener positioning device of claim 1, wherein the resilient ring comprises an O-ring.

5. The fastener positioning device of claim 1, further comprising a chute portion connected to the punch tube, wherein the chute portion is arranged to guide the fastener into the punch tube.

6. The fastener positioning device of claim 5, wherein the fastener is gravity-fed through the chute portion into the punch tube.

7. The fastener positioning device of claim 1, further comprising a punch arranged to travel through the punch tube to install the fastener.

8. The fastener positioning device of claim 1, wherein the at least one retainer is radially displaceable by the fastener.

9. The fastener positioning device of claim 1, wherein in response to an axial force upon the fastener in an axial direction, the fastener is axially displaceable in the axial direction to radially outwardly displace the at least one retainer.

10. The fastener positioning device of claim 9, wherein the first and second retainers are radially outwardly displaceable such that the fastener is displaceable past the first and second retainers in the axial direction.

11. The fastener positioning device of claim 1, wherein the fastener is a stud or a nut.

12. A fastener positioning device for a die block, comprising:

a punch tube arranged to receive a stud or nut, the tube comprising an axis;

a plurality of apertures extending radially out from the tube, each aperture having:

a first respective diameter;

a groove circumferentially disposed about the punch tube and connecting with the first and second apertures; and, a respective edge proximate the tube and with a second respective diameter less than the first respective diameter;

a plurality of balls disposed in the plurality of apertures; and, an O-ring in contact with the plurality of balls and urging the plurality of balls towards the axis, wherein the resilient ring is positioned within the groove, and wherein the plurality of balls are radially displaceable by axial displacement of the stud or nut.

13. A fastener positioning device for a die block, comprising:

a punch tube arranged to receive a stud or nut, the tube comprising an axis;

a plurality of apertures extending radially out from the tube, each aperture including:

a first respective diameter at a respective radially outermost end of said each aperture; and, a second respective diameter, less than the first respective diameter, at a respective radially innermost end of said each aperture;

a plurality of balls disposed in the plurality of apertures; and, an O-ring in contact with the plurality of balls and urging the plurality of balls towards the axis, wherein:

the plurality of balls are radially displaceable by axial displacement of the stud or nut; and, said each aperture tapers inward from the first respective diameter to the second respective diameter.

\* \* \* \* \*